United States Patent
Kim et al.

(10) Patent No.: US 10,388,918 B2
(45) Date of Patent: Aug. 20, 2019

(54) SECONDARY BATTERY

(71) Applicant: SAMSUNG SDI CO., LTD., Yongin-si, Gyeonggi-do (KR)

(72) Inventors: Jinhwan Kim, Yongin-si, Gyeonggi-do (KR); Dongmyung Lee, Yongin-si, Gyeonggi-do (KR); Sunghyun Choi, Yongin-si, Gyeonggi-do (KR)

(73) Assignee: SAMSUNG SDI CO., LTD., Yougin-si, Gyeonggi-do (KR)

( * ) Notice: Subject to any disclaimer, the term of this patent is extended or adjusted under 35 U.S.C. 154(b) by 140 days.

(21) Appl. No.: 15/609,730

(22) Filed: May 31, 2017

(65) Prior Publication Data

US 2017/0373286 A1    Dec. 28, 2017

(30) Foreign Application Priority Data

Jun. 27, 2016  (KR) .................. 10-2016-0080101

(51) Int. Cl.
*H01M 2/02* (2006.01)
*H01M 2/08* (2006.01)
*H01M 10/0587* (2010.01)

(52) U.S. Cl.
CPC ......... *H01M 2/0287* (2013.01); *H01M 2/021* (2013.01); *H01M 2/0277* (2013.01); *H01M 2/0285* (2013.01); *H01M 2/08* (2013.01); *H01M 10/0587* (2013.01); *H01M 2/0275* (2013.01)

(58) Field of Classification Search
None
See application file for complete search history.

(56) References Cited

U.S. PATENT DOCUMENTS

2015/0118533 A1    4/2015  Yi

FOREIGN PATENT DOCUMENTS

| JP | 2002-075299 A | 3/2002 |
|---|---|---|
| KR | 10-2007-0099068 A | 10/2007 |
| KR | 10-2011-0109824 A | 10/2011 |
| KR | 10-2014-0125065 A | 10/2014 |

OTHER PUBLICATIONS

Extended European Search Report dated Aug. 11, 2017 of the European Patent Application No. 16207526.1 corresponding to this application.

*Primary Examiner* — Sarah A. Slifka
(74) *Attorney, Agent, or Firm* — Lee & Morse, P.C.

(57) ABSTRACT

A secondary battery includes an electrode assembly, and a laminate exterior case accommodating the electrode assembly, the laminate exterior case including a pair of long side curve portions spaced apart from each other, a pair of short side curve portions spaced apart from each other, curvature radii of the long side curve portions being larger than those of the short side curve portions, and corner curve portions between respective long side curve portions and short side curve portions.

13 Claims, 6 Drawing Sheets

SECONDARY BATTERY

CROSS-REFERENCE TO RELATED APPLICATION

Korean Patent Application No. 10-2016-0080101, filed on Jun. 27, 2016, in the Korean Intellectual Property Office, and entitled: "Secondary Battery," is incorporated by reference herein in its entirety.

BACKGROUND

1. Field

Exemplary embodiments relate to a secondary battery.

2. Description of the Related Art

In general, a primary battery is not rechargeable, but a secondary battery can be charged and discharged. Low-capacity secondary batteries are used in portable small-sized electronic devices, e.g., a smart phone, a feature phone, a notebook computer, a camcorder and the like, and high-capacity secondary batteries are extensively used as an energy source, e.g., for driving a motor for a hybrid car, an electric vehicle, a power storage cell, and the like.

The secondary battery includes an electrode assembly having a positive electrode and a negative electrode, a case accommodating the electrode assembly, and an electrode tab connected to the electrode assembly. The case can be classified into, e.g., a cylindrical type, a prismatic type, a pouch type, and so on according to the external shape of the case. For example, the pouch type secondary battery can be easily transformed in various shapes and can be formed of a laminate exterior case having a small weight.

SUMMARY

According to exemplary embodiments, there is provided a secondary battery including an electrode assembly, and a laminate exterior case accommodating the electrode assembly, the laminate exterior case including a pair of long side curve portions spaced apart from each other, a pair of short side curve portions spaced apart from each other, curvature radii of the long side curve portions being larger than those of the short side curve portions, and corner curve portions between respective long side curve portions and short side curve portions.

The curvature radii of the long side curve portions may be 1.1 to 3 times larger than those of the short side curve portions. Curvature radii of the corner curve portions may range between the curvature radii of the long side curve portions and the curvature radii of the short side curve portions. Depths of the short side curve portions may be larger than those of the long side curve portions. Depths of the corner curve portions may range between the depths of the short side curve portions and the depths of the long side curve portions. The laminate exterior case may include a planar first exterior case portion and a second exterior case portion covered by the first exterior case portion and having a recess formed to accommodate the electrode assembly. The second exterior case portion may include an extending region extending away from the first exterior case portion and an planar region connected to the extending region and parallel with the first exterior case portion, the long side curve portions and the short side curve portions may be formed at sides where the extending region and the planar region meet, and the corner curve portions may be formed at corners where the extending region and the planar region intersect each other. Thicknesses of the corner curve portions may be smaller than those of the long side curve portions or the short side curve portions.

According to another exemplary embodiments, there is provided a secondary battery including an electrode assembly, and a laminate exterior case accommodating the electrode assembly, the laminate exterior case including a pair of long side curve portions spaced apart from each other, a pair of short side curve portions spaced apart from each other, and corner curve portions between respective long side curve portions and short side curve portions, thicknesses of the corner curve portions being smaller than those of the long side curve portions or the short side curve portions.

The thicknesses of the corner curve portions may be 0.8 to 0.9 times larger than those of the long side curve portions or the short side curve portions. The laminate exterior case may have insulation layers formed on opposite surfaces of a metal layer, and thicknesses of metal layers of the corner curve portions may be smaller than those of the long side curve portions or the short side curve portions. Curvature radii of the long side curve portions may be larger than those of the short side curve portions. Curvature radii of the corner curve portions may range between the curvature radii of the long side curve portions and the curvature radii of the short side curve portion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. It will also be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting embodiments. As used herein, the singular forms are intended to include the plural forms as well, unless the context clearly indicates otherwise. It will be further understood that the terms "comprise, include" and/or "comprising, including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1A:
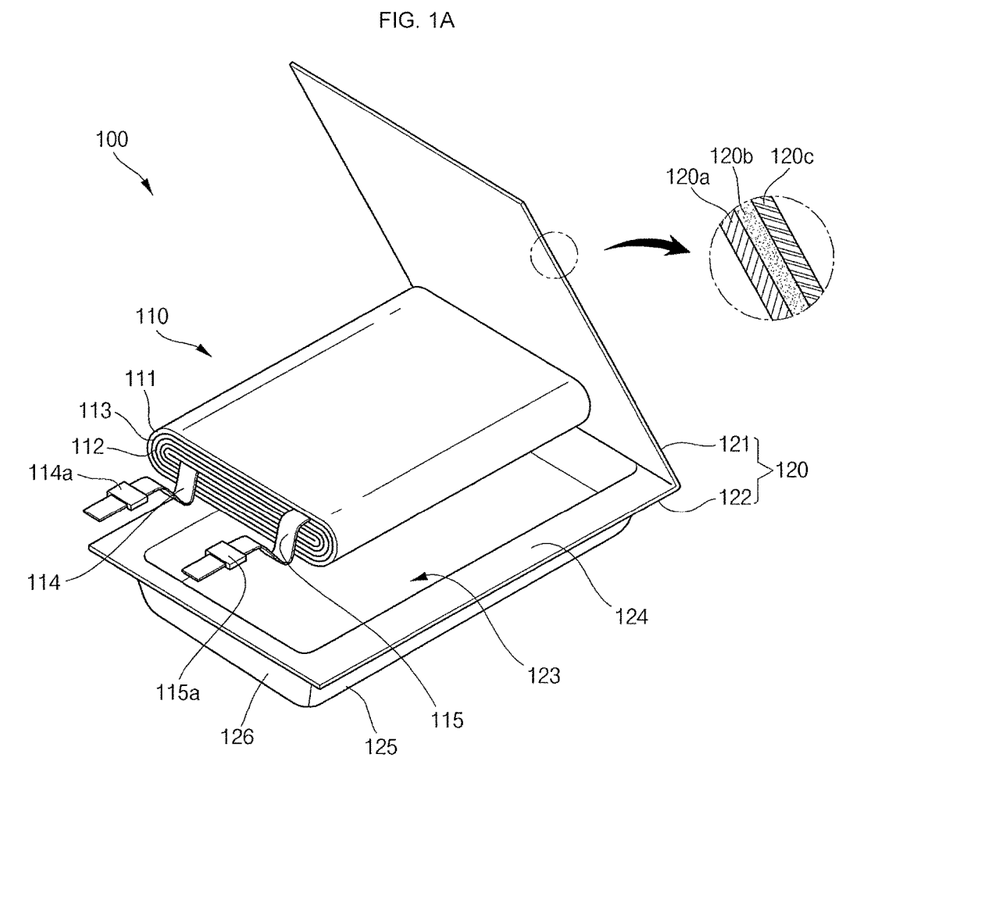
FIGS. 1A and 1B illustrate an exploded perspective view and an assembled plan view of a secondary battery according to exemplary embodiments.
Figure 1B:
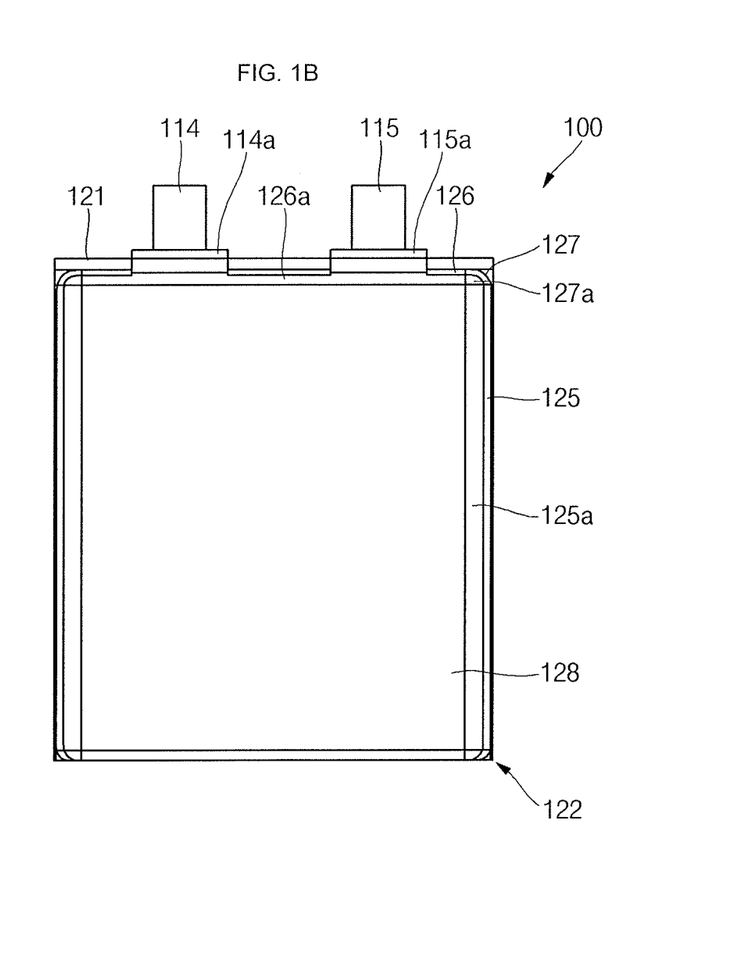

FIGS. 1A and 1B are an exploded perspective view and an assembling plan view of a secondary battery according to exemplary embodiments.

First, as illustrated in FIG. 1A, a secondary battery 100 according to exemplary embodiments may include an electrode assembly 110 and a laminate exterior case 120.

The electrode assembly 110 may include a first electrode 111, a second electrode 112, and a separator 113 interposed between the first electrode 111 and the second electrode 112. For example, the electrode assembly 110 may be formed by winding a stacked structure of the first electrode 111, the separator 113, and the second electrode 112. While the electrode assembly 110 of a winding type or a jelly roll type is exemplified in the illustrated embodiment, a stack type electrode assembly may also be used in an alternative embodiment.

The first electrode 111 may function as a positive electrode and the second electrode 112 may function as a negative electrode, and vice versa. However, the following description will be made on the assumption that the first electrode 111 functions as a positive electrode and the second electrode 112 function as a negative electrode.

The first electrode 111 includes a first electrode active material layer coated on both surfaces of a first electrode current collector made of a highly conductive metal thin plate, e.g., an aluminum foil or mesh, but not limited thereto. For example, a chalcogenide compound may be used as the first electrode active material, but not limited thereto. For example, a composite metal oxide, e.g., $LiCoO_2$, $LiMn_2O_4$, $LiNiO_2$, or $LiNiMnO_2$, may be used as the first electrode active material. A first electrode tab 114 may be formed on a first electrode uncoated portion of the first electrode current collector, where the first electrode active material layer is not formed, but aspects are not limited thereto. That is to say, one end of the first electrode tab 114 may be electrically connected to the first electrode uncoated portion and the other end of the first electrode tab 114 may protrude to the outside. In addition, an insulation member 114a may be attached to the first electrode tab 114, thereby preventing the first electrode tab 114 from being shorted to the laminate exterior case 120.

The second electrode 112 includes a second electrode active material layer coated on both surfaces of a second electrode current collector made of a conductive metal thin plate, e.g., a copper or nickel foil or mesh, but not limited thereto. For example, a carbon-based material, Si, Sn, tin oxide, tin alloy composite, transition metal oxide, lithium metal nitride or lithium metal oxide may be used as the second electrode active material, but not limited thereto. A second electrode tab 115 may be formed on a second electrode uncoated portion of the second electrode current collector, where the second electrode active material layer is not formed, but aspects are not limited thereto. That is to say, one end of the second electrode tab 115 may be electrically connected to the second electrode uncoated portion and the other end of the second electrode tab 115 may protrude to the outside. In addition, an insulation member 115a may be attached to the second electrode tab 115, thereby preventing the second electrode tab 115 from being shorted to the laminate exterior case 120.

The separator 113 is interposed between the first electrode 111 and the second electrode 112 and prevents an electric short between the first electrode 111 and the second electrode 112. The separator 113 may include, but not limited to, one or more of polyethylene, polypropylene, and a porous copolymer of polyethylene and polypropylene. In order to prevent an electric short from occurring between the first electrode 111 and the second electrode 112, the separator 113 may be formed to have a larger width than the first electrode 111 and the second electrode 112.

In addition, the separator 113 may include, but not limited to, a solid electrolyte (e.g., an inorganic ceramic based electrolyte, such as perovskite-based, NASICON-based, LISICON-based, sulfide-based, Garnet-based or glass-based electrolyte, or a polymer based electrolyte). For example, a liquid electrolyte may not be used as the separator 113.

The laminate exterior case 120 accommodates the electrode assembly 110 and is formed by sealing the outer periphery of the electrode assembly 110. The laminate exterior case 120 includes a first exterior case portion 121 and a second exterior case portion 122. The second exterior case portion 122 may include one end connected to the first exterior case portion 121, and a recess 123 having a predetermined depth so as to accommodate the electrode assembly 110. In addition, edges of the first and second exterior case portions 121 and 122, corresponding to the outer periphery of the electrode assembly 110, are thermally fused to each other, thereby allowing the electrode assembly 110 to be accommodated within the laminate exterior case 120 of a pouch type or a pocket type.

That is to say, the laminate exterior case 120 is configured to include the first and second exterior case portions 121 and 122 formed by bending the center of one side of a laminate exterior case shaped of a rectangular plate in a lengthwise direction. The second exterior case portion 122 has the recess 123 having a predetermined depth formed by pressing or drawing so as to accommodate the electrode assembly 110, and a sealing portion 124, i.e., the edge of the second exterior case portion 122, is formed on the outer periphery of the recess 123 to be, e.g., thermally, sealed with the first exterior case portion 121. The sealing portion 124 may be formed along one side where the first exterior case portion 121 and the second exterior case portion 122 integrally adjoin each other, and the other three sides of each of the first exterior case portion 121 and the second exterior case portion 122.

In addition, the second exterior case portion 122 includes four extending regions extending away from the first exterior case portion 121 and a planar region connected to the four extending regions and corresponding to a bottom of the recess 123, as will be described in more detail below with reference to FIG. 1B. For example, relatively long regions among the four extending regions may be defined as long-side extending regions and relatively short regions among the four extending regions may be defined as short-side extending regions.

The first and second electrode tabs 114 and 115 of the electrode assembly 110 are drawn to the outside through fused regions of the first exterior case portion 121 and the second exterior case portion 122. For example, the insulation members 114a and 115b formed on the first and second electrode tabs 114 and 115 are also sealed with the sealing portion 124. That is to say, the insulation members 114a and 115b are faulted at contact portions between the first and second electrode tabs 114 and 115 and the sealing portion 124 to prevent electrical shorts between the first and second electrode tabs 114 and 115 and the laminate exterior case 120.

The laminate exterior case 120 may be formed to have a multi-layered structure including a first insulation layer 120a, a metal layer 120b, and a second insulation layer 120c, but not limited thereto. In addition, the laminate exterior case 120 may also include various adhesive layers or functional layers, but detailed descriptions thereof will not be given so as not to obscure the subject matter.

The first insulation layer 120a defines an internal surface of the laminate exterior case 120 and is made of an insulating and thermally adhesive material. In addition, the first insulation layer 120a is formed on a first surface of the metal layer 120b and defines an internal surface of the laminate exterior case 120 facing the electrode assembly 110. The first insulation layer 120a may be made of, e.g., casted polypropylene (CPP) or an equivalent thereof, which is not reactive with an electrolyte, but not limited thereto. If the electrode assembly 110 is accommodated in the recess 123 of the second exterior case portion 122 and is covered with the first exterior case portion 121, the first insulation layers 120a of the first and second exterior case portions 121 and 122 of the laminate exterior case 120 are brought into contact with each other. Therefore, if the sealing portion 124 is thermally fused, the first insulation layers 120a of the first and second exterior case portions 121 and 122 are adhered to each other, thereby sealing the laminate exterior case 120.

The metal layer 120b is interposed between the first insulation layer 120a and the second insulation layer 120c, prevents external moisture and oxygen from penetrating into the laminate exterior case 120, and prevents an electrolyte filled in the laminate exterior case 120 from leaking to the outside. In addition, the metal layer 120b maintains mechanical strength of the laminate exterior case 120. For example, the metal layer 120b may be made of, but not limited to, aluminum, an aluminum alloy, iron or an iron alloy. The metal layer 120b may be elongated in the course of forming the recess 123, e.g., the metal layer 120b may be drawn out to shape the recess 123. For example, as a result of the elongation, the metal layer 120b may have a reduced thickness at its significantly elongated portion, e.g., at a portion most extended and drawn out, thereby resulting in cracks and lowered damp-proofing efficiency (that is, increasing moisture permeability). Therefore, it is important to control the thickness of the metal layer 120b elongated in the course of forming the recess 123, as will be described in more detail below.

The second insulation layer 120c defines an external surface of the laminate exterior case 120 and serves to absorb mechanical and chemical shocks, e.g., from an external electric device. In addition, the second insulation layer 120c is formed on a second surface of the metal layer 120b, i.e., on a surface opposite the first surface, and defines an external surface of the laminate exterior case 120. The second insulation layer 120c may be made of, e.g., nylon, polyethylene terephthalate (PET), polybuthylene terephthalate (PBT), polybuthylene naphthalate (PBN) or an equivalent thereof.

As illustrated in FIG. 1B, in the secondary battery 100 according to exemplary embodiments, the second exterior case portion 122 of the laminate exterior case 120 may include a plurality of extending regions 125, 126 and 127 extending away from the first exterior case portion 121, and a planar region 128 connected to the plurality of extending regions 125, 126 and 127 and substantially parallel with the first exterior case portion 121.

In detail, the plurality of extending regions 125, 126 and 127 and the planar region 128 may define the recess 123 accommodating the electrode assembly 110. In other words, two of the plurality of extending regions may be defined as the long-side extending regions 125 and the other two extending regions may be defined as the short-side extending regions 126, and corners between the long-side extending regions 125 and the short-side extending regions 126 may be defined as corner extending regions 127.

In addition, the long side curve portion 125a having variable curvature radii are formed at sides, boundaries or regions where the planar regions 128 and the long-side extending regions 125 meet, and the short side curve portion 126a having variable curvature radii are formed at sides, boundaries or regions where the planar regions 128 and the short-side extending regions 126 meet. Accordingly, the long side curve portion 125a is formed in a pair so as to face each other, and the short side curve portion 126a is also formed in a pair so as to face each other.

A corner curve portion 127a having variable curvature radii is formed at a corner or region where all of the planar region 128, the long-side extending region 125, and the short-side extending region 126 meet each other, i.e., a region where the planar region 128 and the corner extending region 127 meet each other. The corner curve portion 127a may include four corner curve portions. In addition, the corner curve portion 127a serves to connect the long side curve portion 125a to the short side curve portion 126a.

According to exemplary embodiments, the curvature radius of the long side curve portion 125a, the curvature radius of the short side curve portion 126a, the curvature radius of the corner curve portion 127a, the thickness of the long side curve portion 125a, the thickness of the short side curve portion 126a, and the thickness of the corner curve portion 127a are adjusted and limited. Therefore, according to embodiments, the elongation of the corner curve portion 127a is reduced, e.g., as compared to related structures, thereby providing a secondary battery having reduced cracks, i.e., improved damp-proofing performance, and improved outer appearance quality, i.e., no creases or cracks, which will later be described in more detail.

Figure 2A:
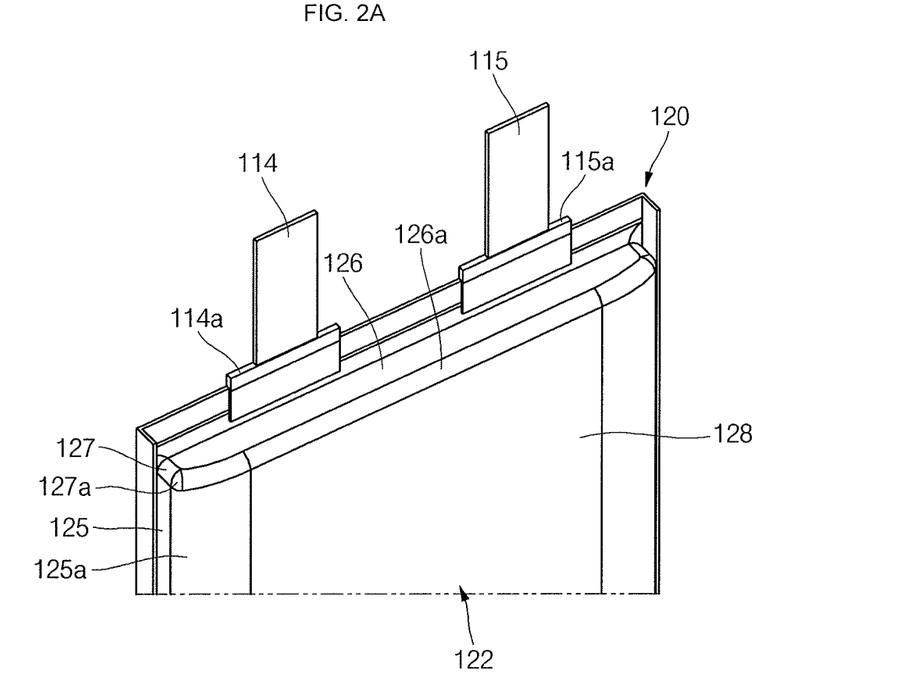
FIGS. 2A and 2B illustrate a partially perspective view and a front view of a secondary battery according to exemplary embodiments.
Figure 2B:
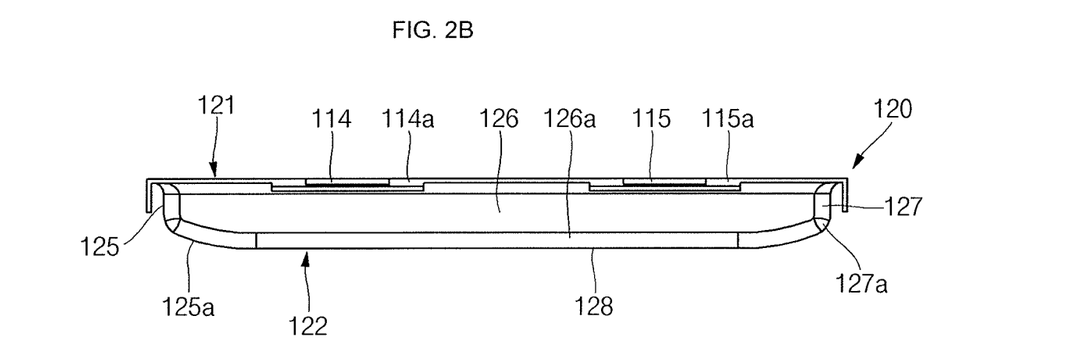

FIGS. 2A and 2B are a partially perspective view and a front view of a secondary battery according to exemplary embodiments.

As illustrated in FIGS. 2A and 2B, in the secondary battery 100 according to exemplary embodiments, the second exterior case portion 122 of the laminate exterior case 120 may include a long-side extending region 125, a short-side extending region 126, a corner extending region 127, a planar region 128, a long side curve portion 125a, a short side curve portion 126a, and a corner curve portion 127a. The recess 123 having a predetermined depth is defined in the second exterior case portion 122 by the above-described constituents, as illustrated in FIG. 1A, thereby allowing the electrode assembly 110 to be accommodated in the recess 123.

In more detail, the long side curve portion 125a having variable curvature radii is formed at a side, boundary or region where the planar region 128 and the long-side extending region 125 meet, e.g., the long side curve portion 125a connects between the planar region 128 and the long-side extending region 125. The short side curve portion 126a having variable curvature radii is formed at a side, boundary or region where the short-side extending region 126 and the planar region 128 meet, e.g., the short side curve portion 126a connects between the short-side extending region 126 and the planar region 128. In addition, the corner curve portion 127a having variable curvature radii is formed at boundaries or regions where the corner extending region 127, the long side curve portion 125a, and the short side curve portion 126a meet, e.g., the corner curve portion 127a connects the corner extending region 127, the long side curve portion 125a, and the short side curve portion 126a.

According to exemplary embodiments, the long side curve portion 125a, the short side curve portion 126a, and/or the corner curve portion 127a have substantially variable curvature radii. That is to say, the long side curve portion 125a, the short side curve portion 126a, and the corner curve portion 127a have curvature radii varying according to locations or regions, rather than having fixed curvature radii, thereby allowing the second exterior case portion 122 of the laminate exterior case 120 to be more securely attached to the electrode assembly 110. In other words, the varying radii in the second exterior case portion 122 allows the sides of the second exterior case portion 122 to more closely trace the shape of the electrode assembly 110, thereby minimizing a gap or a space between the second exterior case portion 122 and the electrode assembly 110. Accordingly, movement or vibration of the electrode assembly 110 can be suppressed by the close proximity of the second exterior case portion 122. Further, the elongation of the metal layer 120b during formation of the recess 123 and occurrence of cracks can be reduced, and the outer appearance quality can be improved, which will later be described in more detail.

Here, the term "variable curvature radii" means that the curvature radii varies at every location or region, rather than being the same at every location or region. In other words, the term "variable curvature radii" means that the curvature radii varies as a distance relative to a fixed reference point on the laminate exterior case 120 changes, rather than having a fixed radii. For example, on the long side curve portion 125a, the curvature radius of the long side curve portion 125a decreases, as a distance from the long-side extending region 125 decreases. Similarly, the curvature radius of the long side curve portion 125a increases, as a distance from the planar region 128 decreases. In another example, on the short side curve portion 126a, the curvature radius of the short side curve portion 126a decreases, as a distance from the short-side extending regions 126 decreases. Similarly, the curvature radius of the short side curve portion 126a increases, as a distance from the planar region 128 decreases. In yet another example, in the corner extending regions 127, the curvature radius of the corner curve portion 127a decreases, as a distance from the corner extending regions 127 decreases. Similarly, the curvature radius of the corner curve portion 127a increases, as a distance from the planar region 128 decreases.

As described above, according to the exemplary embodiments, the planar region 128, the long side curve portion 125a, the short side curve portion 126a, and the corner curve portion 127a are effectively brought into close contact with the electrode assembly 110, thereby efficiently suppressing the electrode assembly 110 from moving or vibrating within the laminate exterior case 120. Accordingly, when the secondary battery is dropped, it is possible to efficiently prevent the electrode assembly 110 from increasing cracks and/or deteriorating the outer appearance due to movement or vibration of the electrode assembly 110.

Figure 3A:
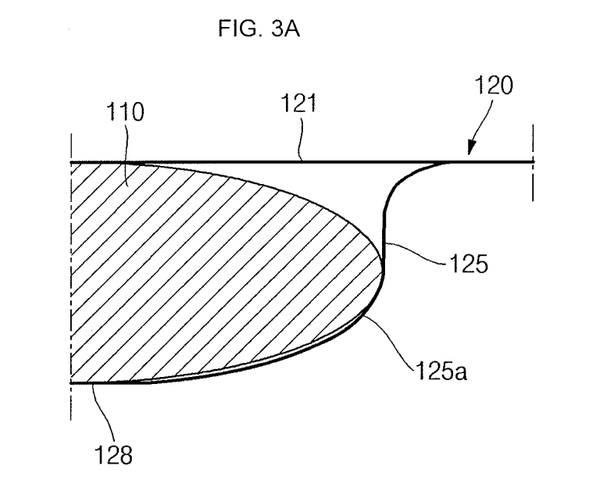
FIGS. 3A, 3B, and 3C illustrate schematic sectional views of a long side curve portion, a corner curve portion, and a short side curve portion in a secondary battery according to an exemplary embodiments.
Figure 3B:
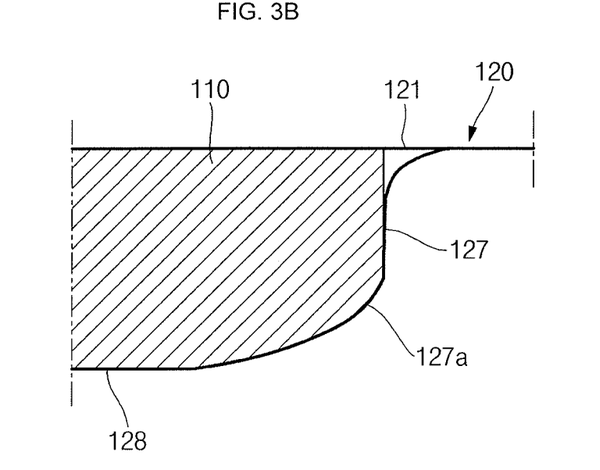
Figure 3C:
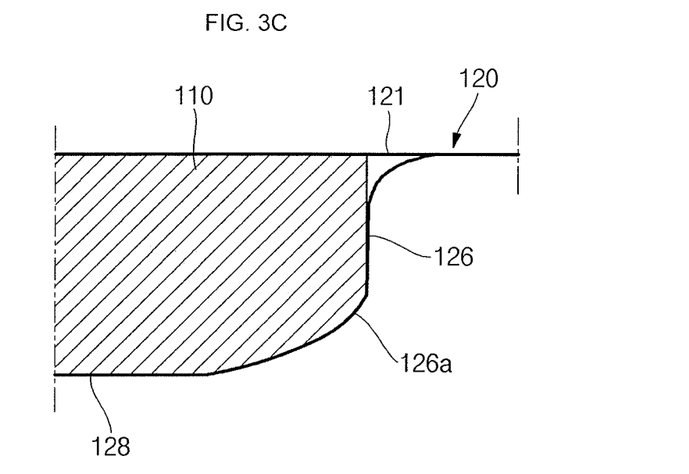
Figure 3D:
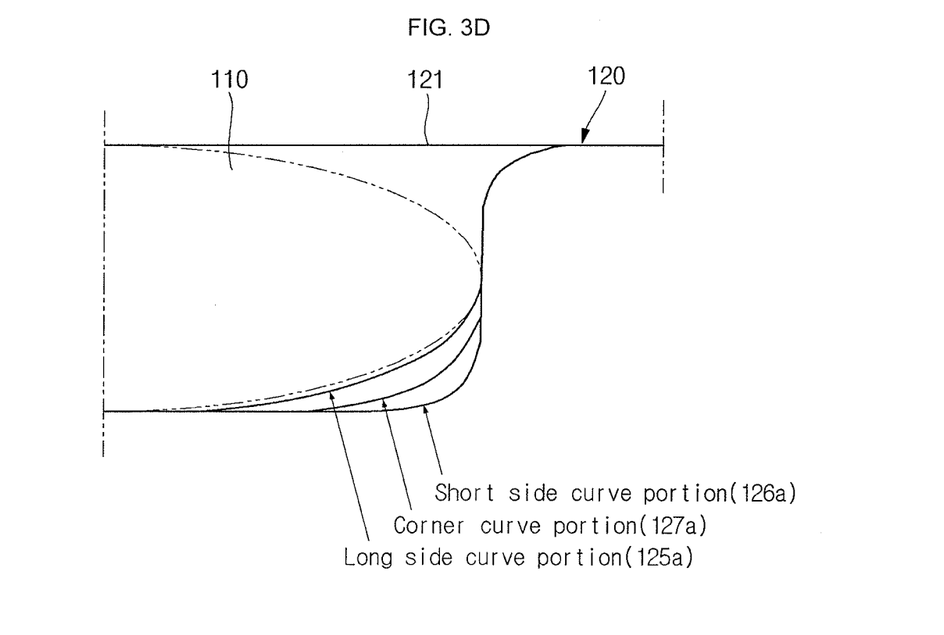
FIG. 3D illustrates a schematic sectional view of virtually superimposed long side curve portion, corner curve portion, and short side curve portion of FIGS. 3A-3C.

FIGS. 3A, 3B, and 3C are schematic sectional views illustrating the long side curve portion 125a, the corner curve portion 127a, and the short side curve portion 126a, respectively, in a secondary battery according to exemplary embodiments. FIG. 3D is a schematic sectional view virtually superimposing the long side curve portion 125a, the corner curve portion 127a, and the short side curve portion 126a.

For a better understanding, it should be noted that the first exterior case portion 121 and the second exterior case portion 122 of the laminate exterior case 120 are illustrated as a single layer, rather than multiple layers. In addition, it should be noted that the curvature radii of the long side curve portion 125a, the corner curve portion 127a, and the short side curve portion 126a are inordinately exaggerated in FIG. 3D for a better understanding.

As illustrated in FIGS. 3A to 3C and FIG. 3D, in the secondary battery 100 according to exemplary embodiments, the curvature radius of the long side curve portion 125a may be larger than that of the short side curve portion 126a. In addition, the curvature radius of the corner curve portion 127a may be smaller than that of the long side curve portion 125a, and may be larger than that of the short side curve portion 126a. That is to say, magnitudes of the curvature radii of the long side curve portion 125a, the corner curve portion 127a, and the short side curve portion 126a are in a descending order, as illustrated in FIG. 3D.

In more detail, the curvature radius of the long side curve portion 125a may be approximately 1.1 to 3 times larger than that of the short side curve portion 126a. Here, if the curvature radius of the long side curve portion 125a is larger than three times that of the short side curve portion 126a, a gap or a space between the electrode assembly 110 and the long side curve portion 125a becomes relatively increased, so that the electrode assembly 110 may move or vibrate within the laminate exterior case 120 when the secondary battery 100 is dropped. In addition, if the curvature radius of the long side curve portion 125a is smaller than 1.1 times that of the short side curve portion 126a, the depth of the recess 123 is relatively small (that is, a sufficiently large space for accommodating the electrode assembly 110 is not provided), making it difficult to accommodate the electrode assembly 110 within the laminate exterior case 120.

In detail, as described above, the electrode assembly 110 may be most securely positioned within the laminate exterior case 120 when the curvature radius of the long side curve portion 125a is approximately 1.1 to 3 times larger than that of the short side curve portion 126a, and the curvature radius of the corner curve portion 127a ranges between the curvature radius of the long side curve portion 125a and the curvature radius of the short side curve portion 126a. That is, if the secondary battery 100 is dropped under the above-stated conditions, the electrode assembly 110 may move or vibrated within the laminate exterior case 120 to the least extent, thereby reducing a probability of cracks occurring to the long side curve portion 125a, the short side curve portion 126a, and the corner curve portion 127a, and preventing quality of outer appearance deterioration. For example, since the respective curvature radii of the long side curve portion 125a, the corner curve portion 127a, and the short side curve portion 126a are variable, they may be defined by, but not limited to, an average curvature radius.

In another, exemplary embodiments may be described with regard to the concept of a depth ranging from the first exterior case portion to a roughly central portion of each curve portion, instead of the concept of the curvature radius. For example, the depth ranging from the first exterior case portion 121 to a roughly central portion of the short side curve portion 126a may be larger than that ranging from the first exterior case portion 121 to a roughly central portion of the long side curve portion 125a. In addition, the depth ranging from the first exterior case portion 121 to the roughly central portion of the corner curve portion 127a may range between the depth ranging from the first exterior case portion 121 to the long side curve portion 125a and the depth ranging from the first exterior case portion 121 to the roughly central portion of the short side curve portion 126a. That is to say, magnitudes of the depths of the recess 123 with respect to the roughly central portion of each of the short side curve portion 126a, the corner curve portion 127a, and the long side curve portion 125a are in a descending order. Under the above-stated conditions most regions of the second exterior case portion 122 are effectively brought into close contact with the electrode assembly 110, thereby efficiently preventing the electrode assembly 110 from moving or vibrating within the laminate exterior case 120.

The reason for the forgoing is because a region of the winding type electrode assembly 110 corresponding to the long side curve portion 125a of the laminate exterior case 120 is formed to be roughly, e.g., approximately, round, and a region corresponding to the short side curve portion 126a of the laminate exterior case 120 is formed roughly, e.g., approximately, at a right angle. Additionally, the region of the winding type electrode assembly 110 corresponding to the long side curve portion 125a of the laminate exterior case 120 is mainly formed as an active material, which is relatively hard, and the region corresponding to the short side curve portion 126a of the laminate exterior case 120 is mainly formed as an end of a separator, which is relatively soft. Therefore, when the laminate exterior case 120 is formed under the above-stated conditions of the curvature radii and/or depths, it is possible to efficiently prevent the electrode assembly 110 from moving or vibrating within the recess 123.

Figure 4A:
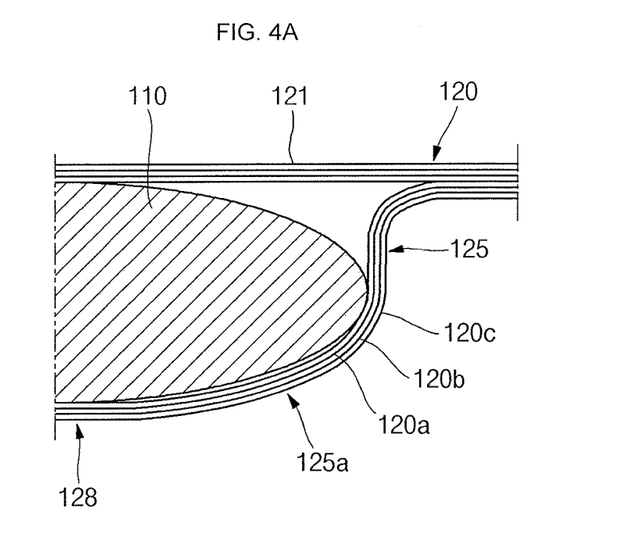
FIGS. 4A and 4B illustrate sectional views of thicknesses of a long side curve portion and a corner curve portion in a secondary battery according to exemplary embodiments.
Figure 4B:
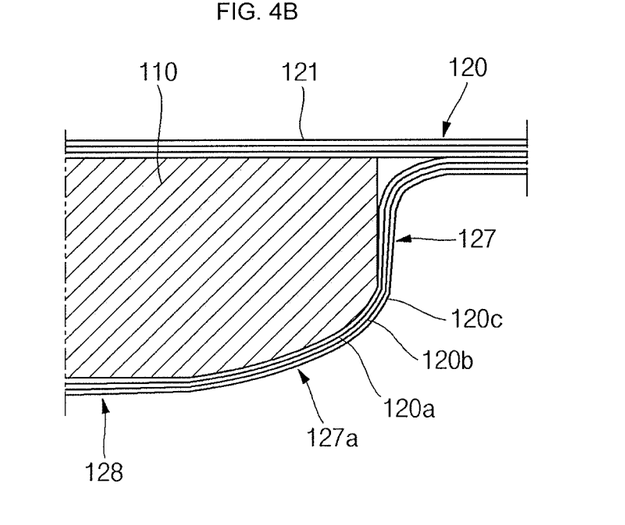

FIGS. 4A and 4B are sectional views illustrating thicknesses of the long side curve portion 125a and the corner curve portion 127a in a secondary battery according to exemplary embodiments. Here, all features of the secondary battery, including thicknesses, may be substantially the same as those of the secondary battery illustrated in FIGS. 3A to 3D.

As illustrated in FIGS. 4A and 4B, in the secondary battery according to exemplary embodiments, a thickness of the corner curve portion 127a may be smaller than a thickness of the long side curve portion 125a and/or a thickness of the short side curve portion 126a. As an example, the thickness of the corner curve portion 127a may be 0.8 to 0.9 times of the thickness of the long side curve portion 125a and/or the thickness of the short side curve portion 126a. It is noted that the thicknesses of the corner curve portion 127a and the long side curve portion 125a refer to corresponding portions of the second exterior case portion 122, i.e., corresponding portions reflecting a total thickness (sum of thicknesses) of the layers 120a, 120b, and 120c illustrated in FIGS. 4A-4B.

For example, if the thickness of the corner curve portion 127a is smaller than approximately 0.8 times that of the thickness of the long side curve portion 125a and/or the thickness of the short side curve portion 126a, the corner curve portion 127a is elongated to a relatively large extent during formation or drawing of the recess 123. In this case, a probability of cracks occurring in the corner curve portion 127a is increased. In another example, if the thickness of the corner curve portion 127a is larger than approximately 0.9 times that of the thickness of the long side curve portion 125a and/or the thickness of the short side curve portion 126a, the corner curve portion 127a is elongated to a relatively small extent during formation or drawing of the recess 123. In this case, the recess 123 having a sufficiently large depth for accommodating the electrode assembly 110 may not be formed.

As described above, the laminate exterior case 120 is configured such that a first insulation layer 120a is formed on the first surface of a metal layer 120b and a second insulation layer 120c is formed on the second surface of the metal layer 120b. However, during formation or drawing of the recess 123, the metal layer 120b may be elongated. Here, the first and second insulation layers 120a and 120c are more elongated than the metal layer 120b.

As an example, the metal layers 120b in the long side curve portion 125a and/or the short side curve portion 126a are maintained to have a thickness in the range of approximately 19 µm to approximately 21 µm even after being elongated, while the metal layer 120b in the corner curve portion 127a is maintained to have a thickness in the range of approximately 16 µm to approximately 18 µm after being elongated. If the thickness of the metal layer 120b in the corner curve portion 127a is smaller than the thickness in the range stated above, cracks are may occur due to external shocks or during formation, and the outer appearance may be deteriorated due to a low level of hardness. Therefore, according to exemplary embodiments, the curvature radius of the corner curve portion 127a is within the above described range so as not to excessively reduce the thickness of the metal layer 120b of the corner curve portion 127a, as illustrated in FIGS. 3A to 3D.

However, if the long side curve portion 125a, the short side curve portion 126a, and the corner curve portion 127a having the above-stated curvature radii are formed by punching or pressing, the thickness varying rate (elongation) of the metal layer 120b can be minimized by minimizing the stress concentration on the corner curve portion 127a. Therefore, cracks may be suppressed from occurring in the corner curve portion 127a, and the quality of outer appearance of the corner curve portion 127a may be improved.

Meanwhile, according to exemplary embodiments, a width of the long side curve portion 125a (that is, a width crossing the long side curve portion 125a) may be larger than a width of the short side curve portion 126a (that is, a width crossing the short side curve portion 126a). Accordingly, a width of the long-side extending region 125 (that is, a width crossing the long-side extending region 125) may be smaller than a width of the short-side extending region 126 (that is, a width crossing the short-side extending region 126). Therefore, according to exemplary embodiments, a gap or a space between the long-side extending region 125 and the long side curve portion 125a of the second exterior case portion 122 and roughly round regions of the electrode assembly 110 corresponding thereto can be minimized. In addition, a gap or a space between the short-side extending region 126 and the short side curve portion 126a of the second exterior case portion 122 and roughly planar regions of the electrode assembly 110 corresponding thereto can be minimized. Moreover, since the corner curve portion 127a is formed between the long side curve portion 125a and the short side curve portion 126a, and the corner extending portion 127 is formed between the long-side extending region 125 and the short-side extending portion 126, the gaps or spaces of the electrode assembly 110 corresponding to the corner extending portion 127 and the corner curve portion 127a can be minimized.

By way of summation and review, exemplary embodiments provide a secondary battery, which can suppress cracks from occurring to corners by reducing corner elongation of a laminate exterior case and can improve the quality of outer appearance of the corners. In detail, as described above, the elongation of corner curve portions of the laminate exterior case is reduced, thereby suppressing cracks from occurring to corner curve portions and improving the quality of outer appearance of the corner curve portions. That is to say, according to exemplary embodiments, the long side curve portions are formed to have larger curvature radii than the short side curve portions, and/or the corner curve portions are formed to have curvature radii between the long side curve portions and the short side curve portions, corner curve portions thereby suppressing cracks from occurring to corner curve portions and improving the quality of outer appearance of the corner curve portions. That is to say, according to exemplary embodiments, damp-proofing performance of the corner curve portions against external moisture can be improved and it is possible to suppress creases or cracks from occurring to the corner curve portions due to external shocks.

In addition, according to exemplary embodiments, the corner curve portions are formed to have smaller thicknesses than the long side curve portions and/or the short side curve portions. In detail, the corner curve portions are formed to have thicknesses of 0.8 to 0.9 times larger than the long side curve portions and/or the short side curve portions, thereby suppressing cracks from occurring to corner curve portions (that is, improving damp-proofing performance) and improving the quality of outer appearance of the corner curve portions (that is, suppressing creases or cracks).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly; and
   a laminate exterior case accommodating the electrode assembly, the laminate exterior case including:
   a planar first exterior case portion, and
   a second exterior case portion covered by the planar first exterior case portion, the second exterior case portion having a recess to accommodate the electrode assembly,
   wherein the recess of the second exterior case portion includes:
   a flat bottom parallel to the planar first exterior case portion,
   a pair of flat long lateral sidewalls spaced apart from each other,
   a pair of flat short lateral sidewalls spaced apart from each other,
   a pair of long side curve portions connecting the pair of flat long lateral sidewalls to the flat bottom, respectively,
   a pair of short side curve portions connecting the pair of flat short lateral sidewalls to the flat bottom, respectively, curvature radii of the long side curve portions being larger than those of the short side curve portions, and
   corner curve portions, each corner curve portion connecting respective long and short side curve portions to each other and respective long and short lateral sidewalls to each other.

2. The secondary battery as claimed in claim 1, wherein the curvature radii of the long side curve portions are about 1.1 times to about 3 times larger than those of the short side curve portions.

3. The secondary battery as claimed in claim 1, wherein curvature radii of the corner curve portions range between the curvature radii of the long side curve portions and the curvature radii of the short side curve portions.

4. The secondary battery as claimed in claim 1, wherein depths of the short side curve portions are larger than those of the long side curve portions.

5. The secondary battery as claimed in claim 1, wherein depths of the corner curve portions range between the depths of the short side curve portions and the depths of the long side curve portions.

6. The secondary battery as claimed in claim 1, wherein the second exterior case portion further includes:
   an extending region extending away from the planar first exterior case portion, and
   the pair of flat long lateral sidewalls and the pair of flat short lateral sidewalls being connected to the extending region.

7. The secondary battery as claimed in claim 1, wherein thicknesses of the corner curve portions are smaller than those of the long side curve portions or the short side curve portions.

8. The secondary battery as claimed in claim 1, wherein the curvature radii of the long side curve portions and the short side curve portions are varying curvature radii.

9. A secondary battery, comprising:
- an electrode assembly; and
- a laminate exterior case accommodating the electrode assembly, the laminate exterior case including:
  - a planar first exterior case portion, and
  - a second exterior case portion covered by the planar first exterior case portion, the second exterior case portion having a recess to accommodate the electrode assembly,
  - wherein the recess of the second exterior case portion includes:
    - a flat bottom parallel to the planar first exterior case portion,
    - a pair of flat long lateral sidewalls spaced apart from each other,
    - a pair of flat short lateral sidewalls spaced apart from each other,
    - a pair of long side curve portions connecting the pair of flat long lateral sidewalls to the flat bottom, respectively,
    - a pair of short side curve portions connecting the pair of flat short lateral sidewalls to the flat bottom, respectively, and
    - corner curve portions, each corner curve portion connecting respective long and short side curve portions to each other and respective long and short lateral sidewalls to each other, thicknesses of the corner curve portions being smaller than those of the long side curve portions or the short side curve portions.

10. The secondary battery as claimed in claim 9, wherein the thicknesses of the corner curve portions are about 0.8 times to about 0.9 times larger than those of the long side curve portions or the short side curve portions.

11. The secondary battery as claimed in claim 9, wherein the laminate exterior case includes insulation layers on opposite surfaces of a metal layer, and thicknesses of portions of the metal layer corresponding to the corner curve portions are smaller than those corresponding to the long side curve portions or the short side curve portions.

12. The secondary battery as claimed in claim 9, wherein curvature radii of the long side curve portions are larger than those of the short side curve portions.

13. The secondary battery as claimed in claim 9, wherein curvature radii of the corner curve portions range between the curvature radii of the long side curve portions and the curvature radii of the short side curve portions.

* * * * *